Figure 1:
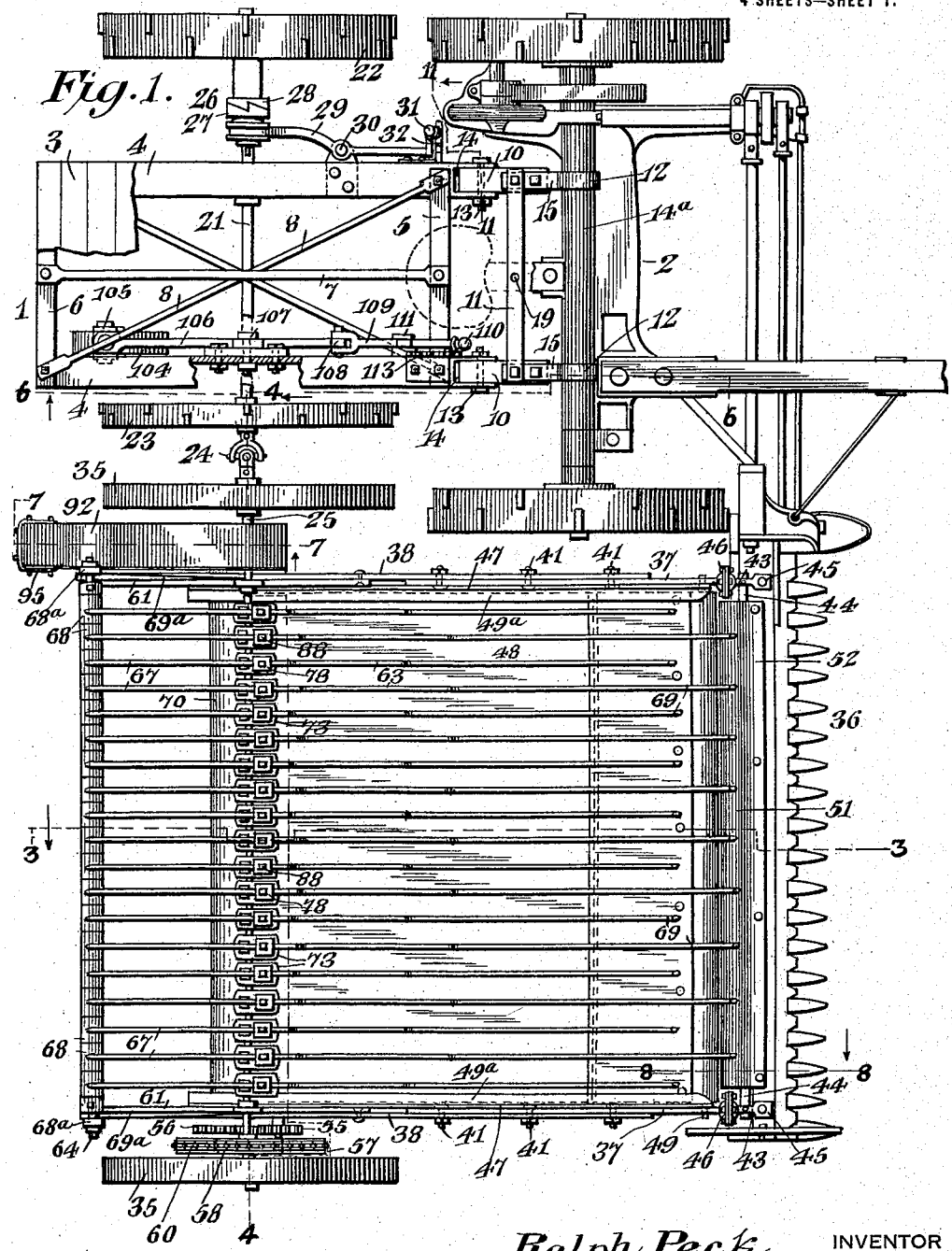

R. PECK.
SEED HARVESTING ATTACHMENT FOR MOWING MACHINES.
APPLICATION FILED SEPT. 4, 1914.

1,167,213.

Patented Jan. 4, 1916.

4 SHEETS—SHEET 1.

WITNESSES

Ralph Peck, INVENTOR

BY

ATTORNEY

R. PECK.
SEED HARVESTING ATTACHMENT FOR MOWING MACHINES.
APPLICATION FILED SEPT. 4, 1914.
1,167,213.
Patented Jan. 4, 1916.
4 SHEETS—SHEET 2.
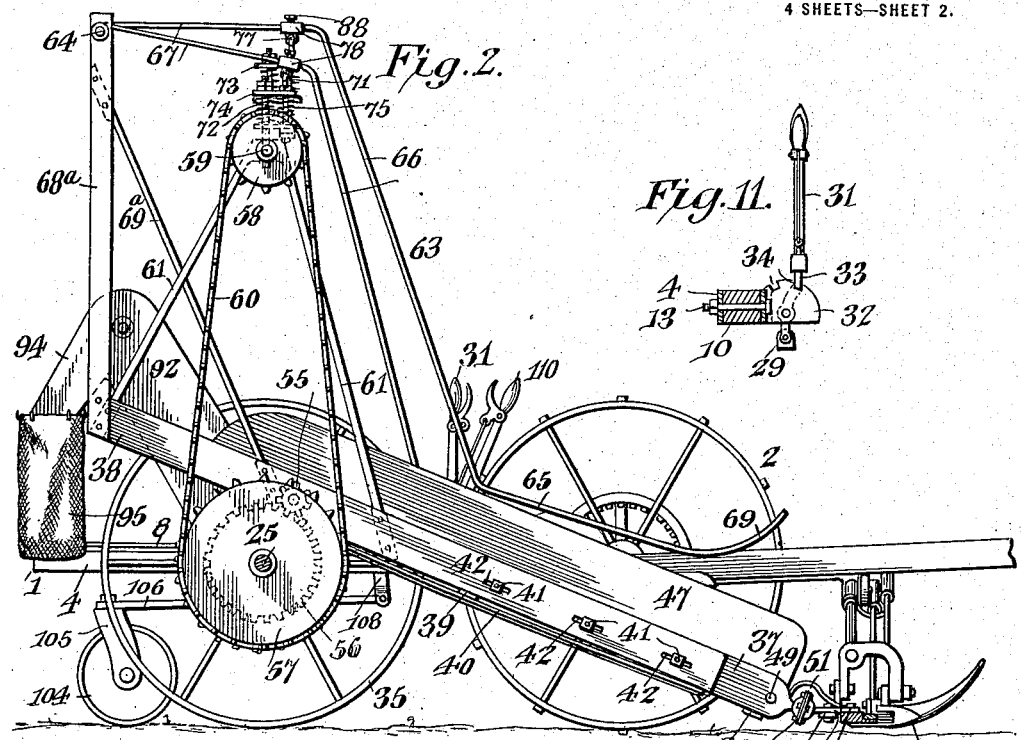
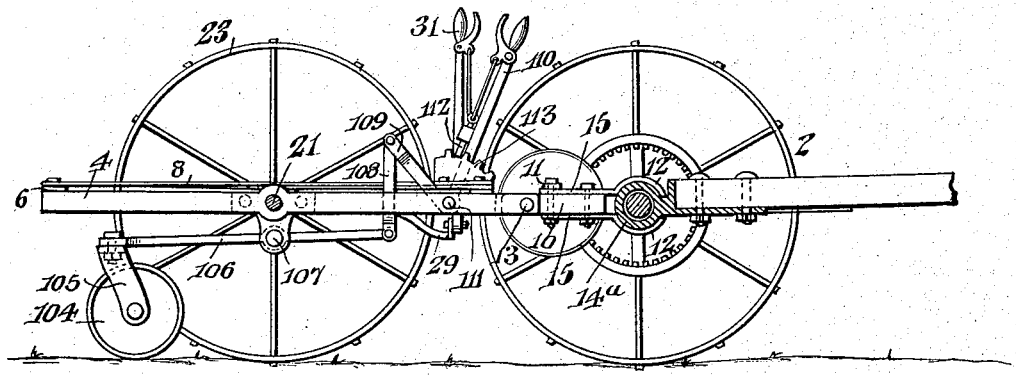
WITNESSES
Jas. K. McCathran
H. T. Riley
Ralph Peck, INVENTOR
BY E. G. Siggers
ATTORNEY R. PECK.
SEED HARVESTING ATTACHMENT FOR MOWING MACHINES.
APPLICATION FILED SEPT. 4, 1914.
1,167,213.
Patented Jan. 4, 1916.
4 SHEETS—SHEET 3.
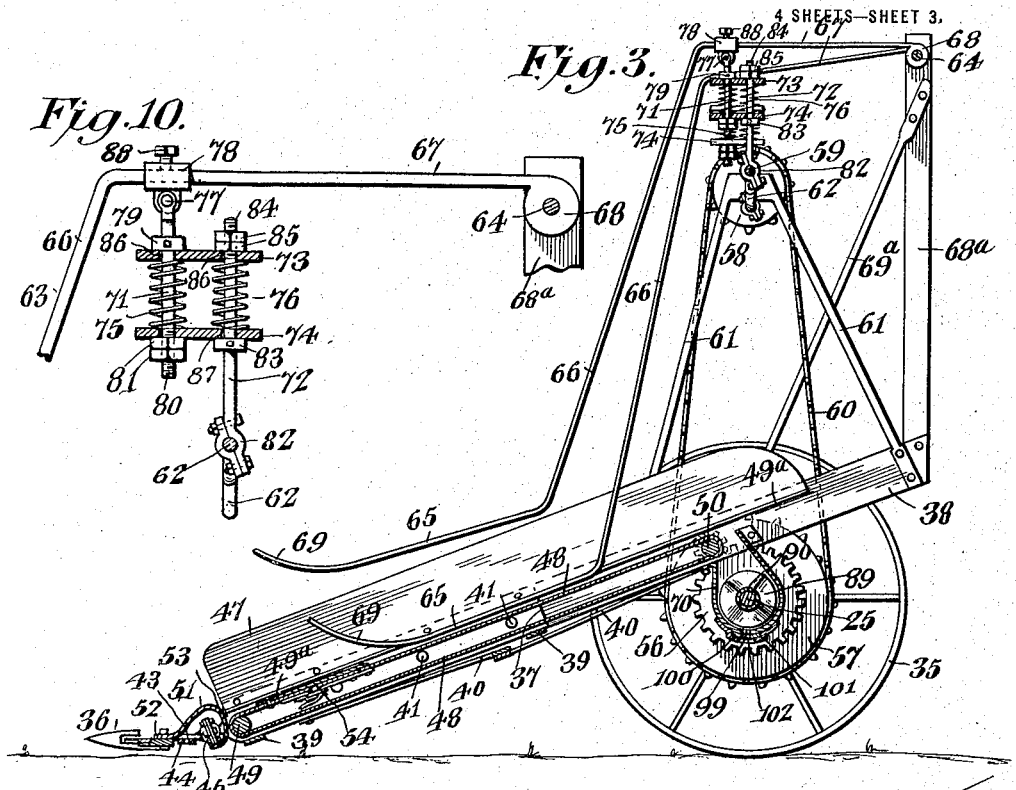
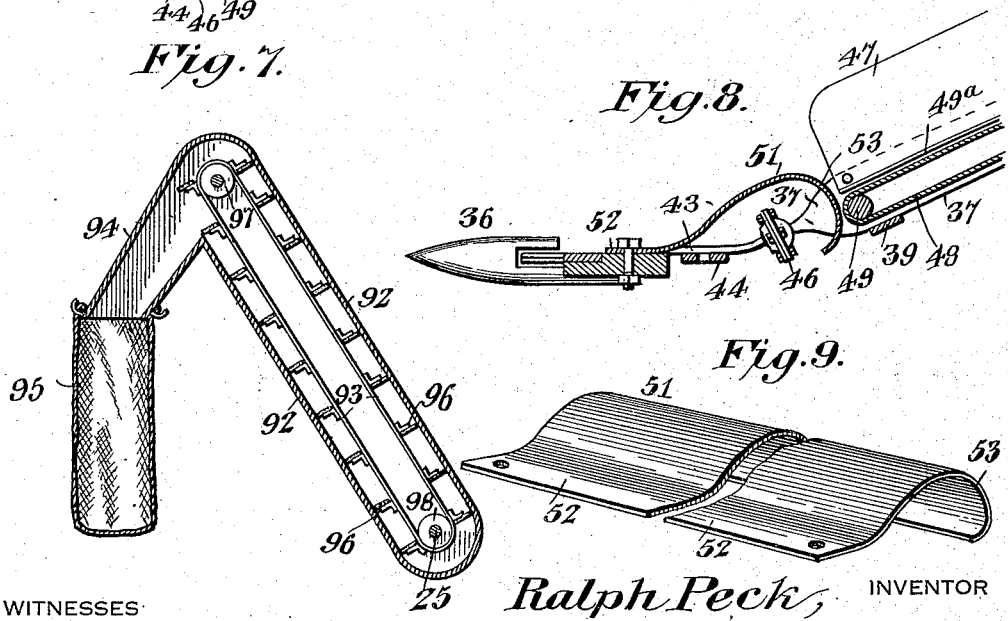
WITNESSES
Jas. K. McCathran
T. F. Riley
Ralph Peck, INVENTOR
BY E. G. Siggers
ATTORNEY R. PECK.
SEED HARVESTING ATTACHMENT FOR MOWING MACHINES.
APPLICATION FILED SEPT. 4, 1914.
1,167,213.
Patented Jan. 4, 1916.
4 SHEETS—SHEET 4.
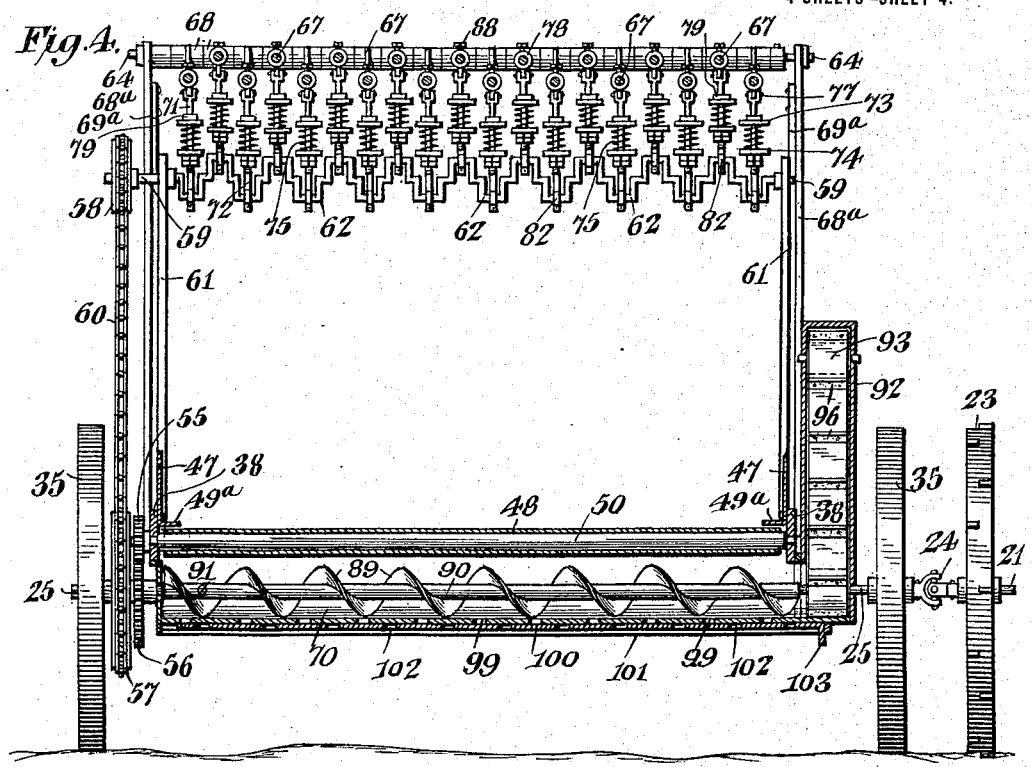
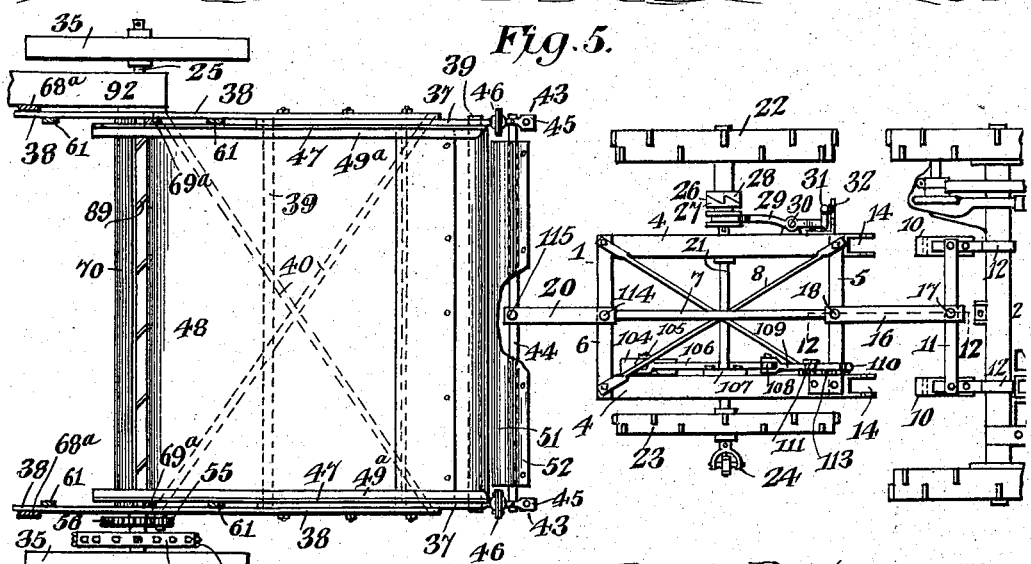
WITNESSES
Ralph Peck, INVENTOR

UNITED STATES PATENT OFFICE.

RALPH PECK, OF VICKSBURG, MISSISSIPPI.

SEED-HARVESTING ATTACHMENT FOR MOWING-MACHINES.

1,167,213.  Specification of Letters Patent.  Patented Jan. 4, 1916.

Application filed September 4, 1914. Serial No. 860,227.

*To all whom it may concern:*

Be it known that I, RALPH PECK, a citizen of the United States, residing at Vicksburg, in the county of Warren and State of Mississippi, have invented a new and useful Seed-Harvesting Attachment for Mowing-Machines, of which the following is a specification.

The invention relates to a seed harvesting attachment for mowing machines.

The object of the present invention is to improve the construction of harvesting attachments for mowing machines and to provide a simple, practical, and efficient seed harvesting attachment of comparatively inexpensive construction, adapted to be readily connected to the frame and cutting apparatus of a mowing machine without affecting the adjustment of the cutting apparatus thereof.

A further object of the invention is to provide a harvesting attachment of this character adapted to save the seed usually lost in cutting, raking and loading various kinds of hay, and capable of beating out and collecting the seed as the hay is cut, and of raising the value of pea hay by removing the dry seed therefrom.

Another object of the invention is to equip the harvesting attachment with beating mechanism capable of adjustment to vary the force of the blow to suit the character of the hay so that the seed may be removed from hay of various conditions, without injuring the hay.

It is also an object of the invention to provide a seed harvesting attachment having means for sowing the seed, so that the bare spots of a field may be sown while the machine is traveling over the same.

The invention also has for its object to provide a seed harvesting attachment which will not interfere with the operation of the cutting apparatus of a mower and which will be capable of beating the hay as rapidly as it is cut and also of discharging and depositing the hay at the point where it was cut.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is a plan view of a seed harvesting attachment constructed in accordance with this invention and shown applied to a mower. Fig. 2 is a side elevation of the same. Fig. 3 is a longitudinal sectional view on the line 3—3 of Fig. 1. Fig. 4 is a transverse sectional view on the line 4—4 of Fig. 1. Fig. 5 is a plan view showing the harvesting attachment arranged for transporting it from one field or place to another, the mower and the harvesting attachment being shown on a smaller scale and parts being omitted for convenience of illustration. Fig. 6 is a longitudinal sectional view taken substantially on the line 6—6 of Fig. 1. Fig. 7 is a longitudinal sectional view on the line 7—7 of Fig. 1. Fig. 8 is an enlarged detail sectional view on the line 8—8 of Fig. 1. Fig. 9 is a detail perspective view of the plate for arching the space between the cutting apparatus and the inclined conveyer. Fig. 10 is an enlarged detail sectional view illustrating the construction of the yieldable means for connecting the beaters with the crank shaft. Fig. 11 is a detail sectional view on the line 11—11 of Fig. 1. Fig. 12 is a detail sectional view on the line 12—12 of Fig. 5.

Like numerals of reference designate corresponding parts in all the figures of the drawings.

The drawings illustrate one embodiment of the invention, while the claims define the actual scope of the same.

Referring to the accompanying drawings, 1 designates a rear frame preferably of oblong form and equipped at its front with a coupling for detachably and flexibly connecting it with the frame 2 of a mower of the ordinary construction, whereby the rear frame is located substantially in the line of the draft of the mower and is adapted to yield to inequalities of the ground. The frame 1, which in practice is designed to be equipped with a suitable platform 3, partly shown in Fig. 1, is composed of side bars 4, front and rear transverse connecting bars 5 and 6, and longitudinal and diagonal braces 7 and 8, but the particular construction of the frame may, of course, be varied to provide a frame of the desired size and strength to suit the requirements and the character of the mower with which the attachment is to be operated.

The coupling for connecting the rear frame 1 with the mower frame 2 comprises spaced longitudinally disposed blocks 10 connected by a transverse bar 11 and provided at the front with upper and lower clip members 12 and pivoted at their rear portions by transverse bolts 13 in bifurcations 14 of the front terminals of the side bars 4 of the rear frame. The clip members 12, which are curved to embrace the tubular bearing portion 14$^a$ of the mower frame, are provided with straight rearwardly extending attaching shanks or portions 15, which are bolted or otherwise secured to the upper and lower faces of the coupling blocks. The transverse bolts 13 are removable to permit the rear frame to be disconnected from the coupling blocks when it is desired to transfer the machine from one field or place to another, and the rear frame is then connected with the mower frame by means of a link bar 16, pivotally connected at its ends by front and rear bolts 17 and 18 with the transverse bar 11 of the coupling and the front transverse bar 5 of the rear frame. This provides sufficient space between the mower frame and the rear frame to enable the frames to be conveniently turned without contacting with each other. The connecting bar 11 of the coupling of the rear frame is provided with a central perforation 19 for the reception of the front bolt 17, and the bolt 18, which pivots the rear end of the link 16 to the front transverse bar 5, also serves for securing the front end of the longitudinal brace 7 to the said bar 5. The front coupling link 16, the central longitudinal brace 7, and a rear coupling link 20 form a draft connection between the mower frame and the parts of the seed harvesting attachment when the latter is arranged to be hauled from one place to another.

The mower is of the ordinary construction and as the attachment is adapted for use in connection with various makes of mowers, a detail description and illustration of the parts of the mower is unnecessary. The rear frame 1 is mounted on a transverse shaft or axle 21, journaled in suitable bearings of the rear frame approximately midway between the front and rear transverse bars 5 and 6, and having a traction wheel 22 arranged on its outer terminal portion and a carrying wheel 23 on its inner end portion, which is connected by a universal coupling 24 with a transverse conveyer shaft 25 arranged in alinement with the said shaft or axle 21. The wheels 22 and 23 are preferably provided with traction rims, and the said wheel 22 is adapted to be connected to the shaft 21 by a clutch 26 composed of two inner and outer clutch members 27 and 28. The outer clutch member 28, which is connected with the traction wheel 22, is adapted to be engaged by the inner clutch member for clutching the traction wheel to the shaft 21 when it is desired to operate the mechanism of the seed harvesting attachment. The inner slidable clutch member 27, which is keyed or otherwise slidably interlocked with the shaft or axle 21, is adapted to be moved outwardly and inwardly into and out of engagement with the clutch member 28 by a shifting lever 29, carried by and extending longitudinally of the rear frame 1 and fulcrumed at an intermediate point at 30. The rear end of the shifting lever is connected with the slidable clutch member and the front end of the said lever 29 is connected to the lower end of an upright operating lever 31, fulcrumed near its lower end on a suitable bracket 32 and carrying a dog or detent 33 for engaging suitable notches 34 of the bracket for holding the slidable clutch member in and out of engagement with the clutch member of the traction wheel.

The transverse shaft or axle 25, which has carrying wheels 35 mounted on its terminal portions, is journaled in suitable bearings of an inclined conveyer frame, located in rear of the cutting apparatus 36 of the mower and detachably and flexibly coupled therewith. The conveyer frame, which may be of any desired construction, preferably consists of front and rear relatively adjustable sections composed of side bars 37 and 38, connected respectively by braces 39 and 40. The braces 39 of the front section of the inclined conveyer frame are transversely disposed and connect the front side bars 37 at the ends thereof. The braces 40 of the rear side bars, which are diagonally arranged, extend from the front terminals of the outer side bars 38 to the rear portions thereof, and are located below the plane of the front side bars and the transverse connecting bars or members 39. The front and rear side bars of the inclined conveyer frame are adjustably secured together in their overlapped relation by means of bolts 41, piercing the front side bars and operating in slots 42 of the front portions of the rear side bars. The coupling for connecting the front end of the inclined conveyer frame with the cutting apparatus 36 of the mower comprises side pieces or members 43 connected by a transverse rod or bar 44 and having enlarged front attaching terminals 45 which are detachably bolted or otherwise secured to the cutting apparatus 36 adjacent to the inner and outer ends thereof. The said side pieces or members are flexibly connected at their rear ends with the front terminals of the front side bars 37 of the inclined conveyer frame by ball and socket joints 46, but any other suitable flexible connection may, of course, be employed. The flexible connection permits the inclined conveyer frame to move independently of the cutting apparatus in adjusting itself to the character of the ground, and the adjustable connection between the front and rear side bars of the conveyer frame enables the latter to be arranged to suit any of the ordinary adjustments of the cutting apparatus.

The inclined conveyer frame is equipped at opposite sides with wings 47, secured to the front side bars 37 and adapted to retain the cut hay on an inclined conveyer belt 48 of a width to extend substantially across the space between the sides of the conveyer frame and arranged on front and rear transverse rolls 49 and 50. The said wings 47 are provided at their lower edges with inwardly projecting flanges 49$^a$, beneath which the side edges of the conveyer belt extend, to prevent any leakage or loss of seed at the sides of the conveyer. The space between the cutting apparatus and the front end of the conveyer is substantially bridged by a plate 51, preferably constructed of resilient sheet metal and having a flat front attaching portion 52 which is bolted or otherwise secured to the cutting apparatus at the rear portion thereof. The plate 51 extends upwardly and rearwardly at an inclination from the front attaching portion, and its rear portion 53 is curved downwardly adjacent to the front end of the conveyer, as clearly illustrated in Fig. 3 of the drawing. The curvature of the rear portion of the plate enables the latter to maintain its position in close proximity to the conveyer in the adjustment of the cutting apparatus. The conveyer belt, which is of the ordinary construction, is provided with the usual adjustable connection 54 to enable it to be varied in length to correspond to any adjustment of the conveyer frame, as the front roll 49 is carried by the front side bars, and the rear roll 50 is mounted in suitable bearings of the outer or rear side bars. The hay severed by the cutting apparatus falls upon the conveyer and is carried upwardly and rearwardly by the same, and is discharged at the rear end of the conveyer frame at the place where it was cut, the gearing for operating the conveyer being designed to be proportioned to cause the conveyer to travel at the proper speed to effect this result. The rear roll carries at its outer end a spur pinion 55, which meshes with a spur gear wheel 56 mounted on the shaft or axle 25, which supports the rear portion of the conveyer frame. The gearing for communicating motion from the shaft or axle 25 to the conveyer is located outside of the conveyer frame, as clearly illustrated in Fig. 4 of the drawings. The transverse shaft or axle 25 also carries a sprocket wheel 57, which is connected with a sprocket pinion 58 of an overhead crank shaft 59 by a sprocket chain 60. The crank shaft 59, which is transversely disposed, is journaled in suitable bearings of approximately A-shaped standards 61, secured to and extending upwardly from the rear portions of the side bars 38 of the conveyer frame. The crank shaft 59 is provided at intervals with crank loops 62, alternately arranged at diametrically opposite points and yieldably and adjustably connected with vibratory beaters 63, consisting of a transverse set of longitudinally disposed rods. The rods, which are mounted on a rear transverse shaft or pivot 64, are angularly bent at their front and rear portions to provide a lower front striking portion 65, an inclined intermediate portion 66, and an upper rearwardly extending portion 67, which is provided at its rear end with a head 68 through which the shaft or pivot 64 passes. The head 68, which is preferably of cylindrical form, operates as a spacing member and maintains the beaters in proper spaced relation. The front terminal 69 of the beater is curved upwardly and forwardly and the lower striking portion 65 is arranged in substantial parallelism with the upper flight of the conveyer when it is at the limit of its downward movement, and it is adapted in its vibration to strike the material cut by the mower and shake out the seed which is carried upwardly by the conveyer and delivered into a transverse trough 70. The transverse shaft or pivot 64 is supported by rear standards 68$^a$ secured at their rear ends to the rear side bars 38 and braced by inclined rods 69$^a$, but the pivot of the vibratory beaters may be mounted and supported in any other desired manner.

In order to enable the force of the blow of the beaters to be controlled and adjusted to suit the character of the cut hay and avoid injuring or impairing the quality thereof, the said beaters are connected with the crank shaft by yieldable connections comprising substantially vertical rods or members 71 and 72, connected at their opposite extremities with crank bends to the beaters, and arranged in spaced overlapped relation. The spaced overlapped portions, which are connected by upper and lower plates 73 and 74, have disposed on them coiled springs 75 and 76, which are interposed between the plates and are adapted to be compressed in the upward and downward movements of the beaters, whereby the latter are cushioned and are adapted to be adjusted to strike the hay with either a light or heavy blow, as desired. The rod 71, which is pivoted at its upper end 77 to a sleeve 78, is provided at its upper portion with a set collar 79, and its lower terminal portion 80 is threaded for the reception of nuts 81. The rear vertical rod 72, which is arranged in rear of the rod 71, is provided at its lower end with a suitable bearing 82 for the crank bend 62, and it is provided at an intermediate point with a set collar 83, and its upper end 84 is threaded for the reception of nuts 85. The upper and lower plates, which are arranged above and below the coiled springs 75 and 76, are provided with openings 86 and 87, for the rods 71 and 72. The nuts and the set collars are adjustable to vary the tension of the springs and to vary the length of the connections between the crank shaft and the beaters. This enables the beaters, when at the lower limit of their movement, to be spaced different distances from the conveyer belt, and the adjustment, also, by varying the tension of the springs, will enable either a hard or light blow to be struck by the beaters in operating on the material cut by the mower. The sleeve 78, which is provided with a set screw 88, is slidable on the upper rear portion 67 and enables the yieldable device to be secured to the beaters at the desired point. As the crank bends of the crank shaft are alternately arranged at diametrically opposite points, the alternate beaters will move in opposite directions, and a thorough and uniform beating of the material is secured to effect a complete removal of the dry seed.

The trough, which is constructed of sheet metal or other suitable material, is approximately U-shaped, and consists of upwardly converging sides and a curved connecting portion arranged concentric with a spiral conveyer 89, which operates within the trough 70. The front wall of the trough is arranged beneath the rear roll 50, and the rear wall of the trough is secured to the rear side bars of the inclined conveyer frame in rear of the rear roll. The rear end of the inclined conveyer extends from the space between the front and rear sides of the trough. The spiral conveyer 89 consists of a spiral blade mounted on a sleeve 90, which is arranged on the transverse shaft or axle 25, being fixed to the same by means of a removable key or pin 91 or other suitable fastening means. The spiral conveyer is adapted to feed the seed along the trough to the inner end thereof, and the inner end of the trough is connected with an inclined casing 92, in which is arranged an endless carrier 93 adapted to convey the seed upwardly and rearwardly to a spout 94. The spout 94 extends downwardly and rearwardly from the upper end of the casing 92, and a bag 95 is adapted to be arranged at the lower end of the spout to receive the seed. The endless carrier, which may be of any desired construction, is illustrated in the accompanying drawings as consisting of an endless belt provided at intervals with blades or buckets 96 and arranged on upper and lower rolls 97 and 98. The upper roll is journaled in suitable bearings of the casing, and the lower roll 98 is preferably mounted directly on the transverse shaft or axle 25, but any other suitable means may be employed for transmitting motion from the shaft to the endless carrier.

The trough 70 is designed to be provided in its bottom connecting portion with perforations 99, constituting seed outlets and adapted to be covered and uncovered by a slide 100, mounted in suitable guides 101 and provided with perforations 102. The perforations 102 of the slide are adapted to be carried into and out of register with the perforations in the bottom of the trough of the spiral conveyer. This will enable the attachment to sow the seed at the bare spots of a field while traveling over the same. The slide 102 is provided at one end with a projecting portion 103 adapted to be grasped by the operator in adjusting the slide, but any other suitable operating means may, of course, be employed for this purpose.

In order to facilitate the turning of the mower and the attachment when the latter is in use, the rear frame is equipped with a caster wheel 104, mounted in a forked standard 105, which depends from the rear end of a longitudinally disposed lever 106. The lever 106, which is fulcrumed intermediate of its ends at 107 to a lug or ear of the rear frame at the inner side thereof, is connected at its front end by a link 108 with a short arm 109 of an operating lever 110. The short arm 109 is arranged at an acute angle to the body portion of the operating lever, which is fulcrumed at its angle at 111 to the rear frame, and the angularly disposed arm 109 extends upwardly and rearwardly from the fulcrum point to a point above the front end of the lever 106. The operating lever 110 is adapted to be oscillated to swing the rear arm of the longitudinally disposed lever 106 downwardly with respect to the rear frame, which is thereby lifted clear of the ground. When the rear frame is lifted it carries with it the outer wheel 22 and the inner wheels 23 and 35, the rear frame and the inner side of the conveyer frame being supported by the caster wheel 105. This enables the mower and the attachment to be readily turned at the corners of a field or other points. The operating lever 110 is equipped with a dog or detent 112 arranged to engage a toothed segment 113 for securing the caster wheel in its adjustment.

When it is desired to move the mower and the attachment from one field or place to another, the rear frame and the conveyer frame are uncoupled from the mower and are connected together and with the mower frame by the front and rear links 16 and 20. The rear link 20 is detachably secured at its terminals to the rear transverse bar 6 and to the connecting bar 44 by bolts 114 and 115, but any other suitable fastening means may be employed for this purpose.

What is claimed is:—

1. A seed harvesting attachment for mowing machines including an endless conveyer located in rear of the cutting apparatus of the mowing machine in position to receive the severed material therefrom, vibratory beaters for beating the seed from the severed material onto the conveyer, mechanism for collecting the seed, and means for operating the conveyer and the said beaters.

2. A seed harvesting attachment for mowing machines including a wheeled conveyer frame located in rear of and provided with means for connecting it with the cutting apparatus of the mowing machine, a conveyer carried by the said frame and arranged in position to receive the severed material from the said cutting apparatus, a wheeled rear frame arranged at one side of the conveyer frame and provided with means for connecting it to the mowing machine, said wheeled frame having a shaft or axle, connections between the said shaft or axle and the conveyer for operating the latter and means also actuated by the said rotary shaft or axle for shaking the seed from the severed material while the latter is on the conveyer.

3. A seed harvesting attachment for mowing machines including a wheeled conveyer frame having a shaft or axle and located in rear of and provided with means for connecting it with the cutting apparatus of the mowing machine, a wheeled rear frame arranged in rear of the frame of the mowing machine and located at one side of the conveyer frame, said wheeled frame having a rotary shaft or axle, means for transmitting motion from the shaft or axle of the rear frame to the shaft or axle of the conveyer frame, a conveyer carried by the conveyer frame and actuated by the shaft or axle thereof, said conveyer being arranged to receive the severed material from the cutting apparatus, and means connected with the shaft or axle of the conveyer frame for shaking the seed from the severed material.

4. A seed harvesting attachment for mowing machines including a wheeled conveyer frame having a shaft or axle and located in rear of and provided with means for connecting it with the cutting apparatus of the mowing machine, a rear wheeled frame located in rear of and provided with means for connecting it with the frame of the mowing machine and having a rotary shaft or axle, a flexible joint or coupling connecting the said shafts or axles, a conveyer carried by the conveyer frame and actuated by the shaft or axle thereof, said conveyer being arranged in position to receive the severed material from the cutting apparatus of the mowing machine, and means carried by the conveyer frame for shaking seed from the severed material while the same is on the conveyer.

5. A seed harvesting attachment for mowing machines including a wheeled conveyer frame located in rear of and provided with means for connecting it with the cutting apparatus of a mowing machine, an endless conveyer carried by the frame and arranged to receive the severed material from the cutting apparatus and discharge the said material from the rear of the conveyer frame, a plurality of vibratory beaters located above the conveyer frame for shaking the seed from the severed material while the latter is on the conveyer, and means for operating the conveyer and the beaters.

6. A seed harvesting attachment for mowing machines including a conveyer frame located in rear of the cutting apparatus of a mowing machine, an endless conveyer carried by the said frame and arranged to receive the severed material from the cutting apparatus and to discharge the severed material at the rear of the conveyer frame, a transverse series of longitudinally disposed beaters pivotally mounted above the conveyer, and means for operating the conveyer and for oscillating the beaters to shake the seed from the severed material onto the conveyer.

7. A seed harvesting attachment for mowing machines including a conveyer frame located in rear of the cutting apparatus of a mowing machine, a conveyer carried by the frame and arranged to receive the severed material from the cutting apparatus to carry the same rearwardly, a transverse series of longitudinally disposed beaters pivotally mounted at their rear portions above the plane of the conveyer and having their front portions arranged to strike the material carried by the conveyer, a crank shaft connected with the beaters, and means for rotating the crank shaft for oscillating the said beaters.

8. A seed harvesting attachment for mowing machines including a conveyer frame located in rear of the cutting apparatus of a mowing machine, a conveyer carried by the frame and arranged to receive severed material from the cutting apparatus, pivotally mounted beaters arranged to strike the material on the conveyer for shaking the seeds from the said material, and yieldable means connected with the beaters for actuating the same.

9. A seed harvesting attachment for mowing machines including a conveyer frame located in rear of the cutting apparatus of a mowing machine, a conveyer carried by the frame and arranged to receive the severed material from the cutting apparatus, a series of pivotally mounted beaters arranged to strike the material on the conveyer for shaking the seeds from the said material, a crank shaft, means for yieldably and adjustably connecting the crank shaft with the beaters for varying the strength of the blow struck by the same and for adjusting the beaters toward and from the conveyer, and means for rotating the crank shaft.

10. A seed harvesting attachment for mowing machines including a conveyer frame located in rear of the cutting apparatus of a mowing machine, a conveyer carried by the frame and arranged to receive the severed material from the cutting apparatus, a plurality of pivotally mounted beaters arranged to strike the material on the conveyer, an actuating element, and yieldable means for connecting the actuating element with the beaters, said yieldable means comprising relatively movable rods and springs disposed on the rods for cushioning the movement thereof.

11. A seed harvesting attachment for mowing machines including a conveyer frame located in rear of the cutting apparatus of a mowing machine, a conveyer carried by the frame and arranged to receive the severed material from the cutting apparatus, a plurality of pivotally mounted beaters arranged to strike the material on the conveyer, an actuating element, and yieldable means for connecting the actuating element with the beaters, said yieldable means comprising relatively movable rods, spaced plates slidably connecting the rods, and springs disposed on the rods and interposed between the plates.

12. A seed harvesting attachment for mowing machines including a conveyer frame located in rear of the cutting apparatus of a mowing machine, a conveyer carried by the frame and arranged to receive the severed material from the cutting apparatus, a plurality of pivotally mounted beaters arranged to strike the material on the conveyer, an actuating element, and yieldable means for connecting the actuating element with the beaters, said yieldable means comprising relatively movable rods, plates slidably connecting the rods, springs disposed on the rods and interposed between the plates, and adjusting means mounted on the rods for engaging the plates for varying the tension of the springs.

13. A seed harvesting attachment for mowing machines including a conveyer frame located in rear of the cutting apparatus of a mowing machine, a conveyer carried by the said frame and arranged to receive severed material from the cutting apparatus, a plurality of beaters disposed longitudinally of the conveyer frame and each consisting of an upper rear pivoted portion, a lower front striking portion having an upwardly extending front terminal, and an intermediate portion extending upwardly from the lower portion and connecting the same with the upper rear portion, and means for vibrating the beaters.

14. A seed harvester, comprising a conveyer onto which the severed material is received, vibratory beaters for removing the grain from the severed material as it fed across the conveyer, and means for actuating said beaters.

15. A seed harvester, comprising a conveyer onto which the severed material is received, vibratory beaters for removing the grain from the severed material as it travels across the conveyer, means for actuating said beaters, and means for regualting the movement of said beaters.

16. A seed harvesting attachment for mowing machines including a conveyer frame located in rear of the cutting apparatus of a mowing machine, a conveyer carried by the said frame and arranged to receive severed material from the cutting apparatus, vibratory beaters for beating the seed from the severed material while the same is on the conveyer, and a ball and socket joint coupling for flexibly connecting the conveyer frame with the cutting apparatus to permit independent adjustment of the latter.

17. A seed harvesting attachment for mowing machines including a conveyer frame located in rear of the cutting apparatus of a mowing machine, a conveyer carried by the said frame and arranged to receive severed material from the cutting apparatus, means for beating the seed from the severed material while the same is on the conveyer, and a coupling connecting the conveyer frame to the cutting apparatus to permit independent adjustment of the latter, said coupling comprising side members detachably secured at their front ends to the cutting apparatus, ball and socket joints connecting the rear ends of the side members and the conveyer frame, and a transverse rod or member connecting the side members together.

18. A seed harvesting attachment for mowing machines including a conveyer frame located in rear of the cutting apparatus of a mowing machine and comprising adjustably connected sections, a flexible coupling for connecting one of the sections of the conveyer frame to the cutting apparatus to permit independent adjustment of the latter, an endless conveyer having front and rear rolls mounted on the sections of the conveyer frame, a conveyer belt arranged on the rolls and provided with adjusting means and wings mounted on one of the sections of the conveyer frame, having inwardly projecting flanges located above the conveyer belt for preventing leakage of the seed at the sides of the conveyer.

19. A seed harvesting attachment for mowing machines including a conveyer frame located in rear of the cutting apparatus of a mowing machine, an endless conveyer disposed longitudinally of the conveyer frame and arranged to receive the severed material from the cutting apparatus, a transverse trough located beneath the rear end of the conveyer, and vibratory beaters for beating the seed from the severed material while the latter is on the conveyer.

20. A seed harvesting attachment for mowing machines including a conveyer frame located in rear of the cutting apparatus of a mowing machine, an endless conveyer carried by and extending longitudinally of the conveyer frame and adapted to receive severed material from the cutting apparatus, vibratory beaters for beating the seed from the severed material while the same is on the conveyer, a trough arranged to receive the seed from the conveyer and provided with outlets for the discharge of seed to sow the latter broadcast, and means for controlling the discharge of seed from the outlets.

21. A seed harvesting attachment for mowing machines including a conveyer frame located in rear of the cutting apparatus of a mowing machine, an endless conveyer carried by and extending longitudinally of the conveyer frame and adapted to receive severed material from the same, vibratory beaters for beating the seed from the severed material while the same is on the conveyer frame, a transverse trough located beneath the rear end of the conveyer in position to receive seed therefrom and provided with perforations for the discharge of seed to sow the same broadcast, and a seed slide for controlling the discharge of seed through the perforations.

22. A seed harvesting attachment for mowing machines including a wheeled conveyer frame located in rear of the cutting apparatus of a mowing machine and provided with means for detachably connecting it therewith, a wheeled rear frame having a rotary shaft or axle and located in rear of the frame of the mowing machine and provided with means for detachably connecting it with the mowing machine frame, a conveyer carried by the conveyer frame and arranged to receive severed material from the cutting apparatus, means for shaking the seed from the material while the same is on the conveyer, means actuated by the said rotary shaft or axle for operating the conveyer and the shaking means, and means for coupling the conveyer frame to the rear frame and for coupling the latter to the mower frame for arranging the said frames in alinement when the conveyer frame and the rear frame are detached.

23. A seed harvesting attachment for mowing machines including a conveyer frame located in rear of the cutting apparatus of a mowing machine, a conveyer carried by the conveyer frame and arranged to receive severed material from the cutting apparatus, means for shaking the seed from the severed material while the same is on the conveyer, a wheeled frame arranged in rear of the mowing machine at one side of the conveyer frame, said wheeled frame having a shaft or axle connected with and adapted to actuate the conveyer and the shaking means, and means for flexibly coupling the wheeled frame to the frame of the mowing machine, said coupling means comprising spaced members pivotally connected to the wheeled frame at opposite sides thereof, and clips secured to the said members and embracing the mowing machine frame.

24. A seed harvesting attachment for mowing machines including a wheeled frame having a shaft or axle and provided at the front with spaced bifurcated portions, blocks pivotally mounted in the bifurcated portions of the wheeled frame, clips composed of upper and lower members secured to the blocks and embracing the mowing machine frame, a conveyer frame located in rear of the cutting apparatus of the mowing machine, a conveyer mounted on the conveyer frame and arranged to receive severed material from the cutting apparatus, and means for connecting the shaft or axle of the wheeled frame with the conveyer and with the shaking means.

25. A seed harvesting attachment for mowing machines including a wheeled frame located in rear of the frame of a mowing machine, coupling blocks detachably pivoted to the wheeled frame at opposite sides thereof, means for securing the coupling blocks to the mowing machine frame, and a transverse bar or member connecting the coupling blocks and adapted to be coupled to the wheeled frame when the pivoted blocks are detached therefrom.

26. A seed harvesting attachment for mowing machines including a wheeled conveyer frame located in rear of and provided with means for flexibly connecting it with the cutting apparatus of a mowing machine, a conveyer mounted on the said frame and arranged to receive severed material from the cutting apparatus, means for shaking the seed from the material, a wheeled rear frame located in rear of and provided with means for flexibly connecting it with the mowing machine frame and the conveyer frame, said rear frame carrying means for actuating the conveyer and the shaking means, and a caster wheel movably mounted on the rear frame and adapted to support the same and the inner portion of the conveyer frame in an elevated position.

27. A seed harvesting attachment for mowing machines including a wheeled conveyer frame located in rear of and provided with means for flexibly connecting it with the cutting apparatus of a mowing machine, a conveyer mounted on the said frame and arranged to receive severed material from the cutting apparatus, means for shaking the seed from the material, a wheeled rear frame located in rear of and provided with means for flexibly connecting it with the mowing machine frame and carrying means for actuating the conveyer and the shaking means, a lever pivotally mounted on the rear frame, a caster wheel carried by the lever, and operating means for oscillating the said lever to elevate the rear frame and the inner portion of the conveyer frame.

28. A seed harvesting attachment for mowing machines including a wheeled conveyer frame located in rear of and provided with means for flexibly connecting it to the cutting apparatus of a mowing machine, a conveyer mounted on the said frame and arranged to receive severed material from the cutting apparatus, means for shaking the seed from the material, a wheeled rear frame located in rear of and provided with means for flexibly connecting it with the mowing machine frame and the conveyer frame, said rear frame carrying means for actuating the conveyer and the shaking means, a lever pivotally mounted on the rear frame, a caster wheel carried by the lever, an upright operating lever having an inclined arm extending from the said lever, and means for connecting the latter with the inclined arm.

29. A seed harvesting attachment for mowing machines including an endless conveyer located in rear of the cutting apparatus of a mowing machine in position to receive the severed material therefrom, vibratory beaters for beating the seed from the severed material while the same is on the conveyer, and means for collecting the said seed and for sowing portions thereof broadcast while the attachment is in operation.

In testimony that I claim the foregoing as my own, I have hereto affixed my signature in the presence of two witnesses.

RALPH PECK.

Witnesses:
A. B. CONWAY,
W. CONWAY.

Copies of this patent may be obtained for five cents each, by addressing the "Commissioner of Patents, Washington, D. C."